United States Patent
Singer

(10) Patent No.: US 10,248,999 B2
(45) Date of Patent: *Apr. 2, 2019

(54) SYSTEM AND METHOD FOR OPTIMIZING THE FREQUENCY OF MARKET INFORMATION UPDATES IN AN ELECTRONIC TRADING ENVIRONMENT

(71) Applicant: Trading Technologies International, Inc., Chicago, IL (US)

(72) Inventor: Scott F. Singer, Green Oaks, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/074,371

(22) Filed: Nov. 7, 2013

(65) Prior Publication Data

US 2014/0143119 A1    May 22, 2014

Related U.S. Application Data

(63) Continuation of application No. 13/765,910, filed on Feb. 13, 2013, now Pat. No. 8,606,690, which is a
(Continued)

(51) Int. Cl.
*G06Q 30/02* (2012.01)
*G06Q 40/04* (2012.01)

(52) U.S. Cl.
CPC ............ *G06Q 40/04* (2013.01); *G06Q 30/02* (2013.01)

(58) Field of Classification Search
CPC .. G06Q 20/04; G06Q 20/4016; G06Q 20/403; G06Q 20/042; G06Q 30/08;
(Continued)

(56) References Cited

U.S. PATENT DOCUMENTS 7,389,265 B2   6/2008  Lawrence et al.
7,555,485 B2   6/2009  Soulanille
(Continued)

OTHER PUBLICATIONS

Chris Buckley, "Implementation of the SMART Information Retrieval System," Department of Computer Science, Cornell University, Ithaca, New York, (May 1985).*
(Continued)

*Primary Examiner* — Virpi H Kanervo
(74) *Attorney, Agent, or Firm* — McDonnell Boehnen Hulbert & Berghoff LLP

(57) ABSTRACT

A system and method for optimizing the frequency of market information updates in an electronic trading environment are described herein. According to one example embodiment, by optimizing the frequency of market information updates, the burden on the client device to update the graphical user interface may be reduced, while still providing an accurate portrayal of the market to the user. An example method includes associating different precedence levels with messages comprising market information. Messages containing market information related to the inside market may be associated to a higher precedence level. Whereas messages containing market information relating to the quantities at prices outside the inside market may be associated with a lower precedence level. Based on the precedence level associated with a message, a client device may update the graphical user interface or the message may be stored in a data structure until a pre-defined condition is satisfied.

15 Claims, 3 Drawing Sheets

Related U.S. Application Data continuation of application No. 13/614,126, filed on Sep. 13, 2012, now Pat. No. 8,407,135, which is a continuation of application No. 11/614,411, filed on Dec. 21, 2006, now Pat. No. 8,290,850.

(58) Field of Classification Search
CPC .......... G06Q 30/0241; G06Q 30/0256; G06Q 30/0272; G06Q 30/0275; G06Q 30/06; G06Q 40/04; G06Q 40/00; G06Q 40/06; G06Q 40/025; G06Q 40/08
See application file for complete search history.

(56) References Cited

U.S. PATENT DOCUMENTS

| | | | |
|---|---|---|---|
| 7,586,484 | B2 | 9/2009 | Sampsell et al. |
| 7,627,682 | B2 | 12/2009 | Uthe |
| 7,685,049 | B1 | 3/2010 | Singer |
| 7,747,513 | B2 | 6/2010 | Duquette et al. |
| 8,082,573 | B2 | 12/2011 | Miyamoto et al. |
| 8,290,850 | B1 | 10/2012 | Singer |
| 8,407,135 | B2 | 3/2013 | Singer |
| 2003/0126068 | A1 | 7/2003 | Hauk et al. |
| 2004/0039733 | A1 | 2/2004 | Soulanille |
| 2004/0244045 | A1 | 12/2004 | Miyamoto et al. |
| 2005/0044037 | A1* | 2/2005 | Lawrence ............... G06Q 20/04 705/38 |
| 2006/0039293 | A1 | 2/2006 | Uthe |
| 2006/0066503 | A1 | 3/2006 | Sam Psell et al. |
| 2006/0069635 | A1 | 3/2006 | Ram et al. |
| 2006/0200404 | A1 | 9/2006 | Stearns |
| 2006/0265309 | A1 | 11/2006 | Sweeting et al. |
| 2007/0005481 | A1* | 1/2007 | Kedia ................... G06Q 40/04 705/37 |
| 2007/0208647 | A1 | 9/2007 | Gemuenden et al. |
| 2008/0097887 | A1 | 4/2008 | Duquette et al. |
| 2013/0006841 | A1 | 1/2013 | Singer |
| 2013/0151395 | A1 | 6/2013 | Singer |

OTHER PUBLICATIONS

Sarin et al., "Using History Information to Process Delayed Database Updates," Proceedings of the Twelfth International Conference on Very Large Databases, Kyoto—Japan (Aug. 1986).*

Bigrigg, "Survivable Information Storage Systems," Computer (Aug. 2000).*

Berrada, T., "Incomplete Information, Heterogeneity, and Asset Pricing" [online], Journal of Financial Econometrics, Oxford: Winter 2006, vol. 4, Iss. 1, p. 136 (Abstract Only). [Retrieved on Jun. 21, 2012] from the Internet: http://proquest.umi.com/, ProQuest Document ID: 958859761.

Canter, M.S., Ph.D., "Price Discovery in Futures Markets" [online], Ph.D. Dissertation, Columbia University, New York: 1996, 134 Pages. (Abstract only), AAT 9631673. [Retrieved on Jun. 21, 2012] from the Internet: http://proquest.umi.com/, ProQuest Document ID: 743048241.

Chen, Ling and Chen, Gen-Cai. "Fuzzy DR Algorithm for Data Distribution Management," Journal of Zhejiang University, Sep. 2006, pp. 1521-1525 (Abstract only).

Garcia, Albert B. "Estimating Computer Communication Network Performance Using Network Simulations," the University of Dayton, UMI Dissertation Publishing, 1985 (Abstract).

Hunter, J., "LAN Bridges Bridging the Gap" [online], Network World, vol. 6, No. 27, Jul. 10, 1989, ProQuest Central, p. 39.

Johnson, T.D., Ph.D., "Connection Level Priority/Pre-Emption Service for Asynchronous Transfer Mode Communication Networtks" [online], Ph.D. Dissertation, ProQuest Dissertations and Theses (PQDT), 1997, 422 pages.

Raghavan, Gopalakrishna. "Industrial Strength Formalization of Object-Oriented Real-Time Systems," Florida Atlantic University, UMI Dissertation Publishing, 2000.

Scarborough, B., "Distributed Database Gives More Data Independence and Sharing" [online], Computing Canada, Willowdale: May 30, 1985, vol. 11, Iss. 11, Pg. Software (2 pages) (Abstract only). [Retrieved on Jun. 21, 2012] from the Internet: http://proquest.umi.com/, ProQuest Document ID: 7066702.

Ye, J., Ph.D., "An Investigation of Market Fragmentation and the Specialist's Quotation Strategy," [online], Ph.D. Dissertation, ProQuest Dissertations and Theses (PQDT), 1995, 110 pages.

* cited by examiner

SYSTEM AND METHOD FOR OPTIMIZING THE FREQUENCY OF MARKET INFORMATION UPDATES IN AN ELECTRONIC TRADING ENVIRONMENT

CROSS REFERENCE TO RELATED APPLICATIONS

This application is a continuation of U.S. patent application Ser. No. 13/765,910, filed Feb. 13, 2013, now issued as U.S. Pat. No. 8,606,690, which is a continuation of U.S. patent application Ser. No. 13/614,126, filed Sep. 13, 2012, now issued as U.S. Pat. No. 8,407,135, which is a continuation of U.S. patent application Ser. No. 11/614,411, filed Dec. 21, 2006, now issued as U.S. Pat. No. 8,290,850, entitled "System and Method for Optimizing the Frequency of Market Information Updates in an Electronic Trading Environment," the contents of each of which are fully incorporated herein by reference for all purposes.

FIELD OF INVENTION

The present invention is directed to electronic trading. More specifically, the present invention is directed towards a system and method for optimizing the frequency of market information updates in an electronic trading environment.

BACKGROUND

An exchange is a central marketplace with established rules and regulations where buyers and sellers, referred to as traders, meet to trade. Some exchanges, referred to as open outcry exchanges, operate using a trading floor where buyers and sellers physically meet on the floor to trade. Other exchanges, referred to as electronic exchanges, operate by an electronic or telecommunications network. An electronic exchange typically provides computerized matching between traders. Some example electronic exchanges include European Exchange ("Eurex"), London International Financial Futures and Options Exchange ("LIFFE"), Chicago Mercantile Exchange ("CME"), and Chicago Board of Trade ("CBOT").

With respect to electronic exchanges, traders connect to an electronic trading platform by way of a communication link through their client devices. Once connected, traders select which tradable objects they wish to trade. As used herein, the term "tradable object" refers to anything that can be traded with a quantity and/or a price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradable object may be "real," such as products that are listed by an exchange for trading, or "synthetic," such as a combination of real products that is created by the user. A tradable object could actually be a combination of other tradable objects, such as a class of tradable objects.

The messages communicated between the electronic exchange and the client device include market updates containing market information, as well as orders, quotes, acknowledgements, fills, cancels, deletes, cancel and replace, and other well-known financial transaction messages. Although the amount or type of market information published by each exchange often differs, there are some standard pieces of information. Market information may include data that represents just the inside market which refers to the lowest sell price (best ask) and the highest buy price (best bid) at particular point in time. Market information may also include market depth, which refers to quantities available at the inside market and can also refer to quantities available at other prices away from the inside market.

Once the client device receives the market update message, the contained market information may, for example, be processed and displayed on the trading screen for a trader to utilize. Although traders use the market information in a variety of ways, traders typically prefer the market information to be displayed in an efficient and useable format. Upon viewing the market information, traders can take certain actions including sending buy or sell orders to the electronic exchange, adjusting existing orders, deleting orders, or otherwise managing orders.

Maintaining a high level of performance and providing the most up to date market information as quickly as possible has become a challenge for most current trading systems. It is desirable for traders to have the most up to date and accurate market information available at all times. Fortunately for them, market updates from the electronic exchange are often provided to the trader in near real time. However, due to the massive amounts of market updates received from an electronic exchange or a network device, the central processing unit (CPU) capabilities at network and client devices have been jeopardized and extremely overwhelmed. Instead of updating the trading screen with near real-time market information, many current trading systems have succumbed to an increased delay in processing and updating the graphical display. In an industry where speed and accuracy are of the utmost importance, receiving delayed and inaccurate market information can be extremely detrimental to a trader and can possibly cost the trader hundreds, thousands, or even millions of dollars.

It is therefore beneficial to provide a trading system that offers a more efficient method for providing market information to a trader in an electronic trading environment.

SUMMARY

The example embodiments are directed to system and methods for optimizing the frequency of market information updates in an electronic trading environment. By optimizing the frequency of market information updates, the burden on the client device to update the graphical user interface can be reduced, while still providing an accurate portrayal of the market to the user.

The system and method are based on a concept that certain pieces of market information are more important to traders than others. For example, a trader might base most of his or her decisions on changes of the inside market, while placing less emphasis on what is occurring at prices outside of the inside market. In another example, a trader might place more emphasis on last trades or some other item of interest. The system and method builds on this concept to provide an efficient mechanism for updating market information on the trading screen in a way that does not significantly restrain the delivery of important pieces of market information to the trader. Thus, the system and method allows the trader to get the market information that is most important to him or her, while at the same time reducing the overall burden on the client side devices.

Particularly, updating a graphical user interface places a burden on the client device as it can only be updated as quickly as the defined refresh rate allows and requires massive amounts of CPU processing power. The rate that the client device can update the graphical user interface is commonly defined as the refresh rate. Optimizing the amount of market information and controlling when the market information is updated on the graphical user interface reduces how many times the graphical user interface is "repainted" or refreshed with new market information as well as reduces the overall CPU usage. The saved CPU usage may then be available to same or other processes taking place on the client device.

An example method described herein, includes receiving messages containing market information at a client device. Once a message is received, the client device determines what market information is included in the message, and based on the market information included in the message, the client device either updates the graphical user interface with the included market information, or stores the market information in a data structure. A message containing market information relating to the inside market is generally higher precedence to the trader, and the market information may be processed and then updated on the graphical user interface as soon as possible. For example, market information relating to an inside market price change is extremely important to a trader and in some instances may be more important than market information relating to an inside market quantity change. However, a message containing market information not relating to the inside market is generally considered to be a lower precedence to the trader, and the market information is stored in a data structure until a pre-defined condition or triggering event is satisfied.

Receiving a high precedence message may be an example of a pre-defined condition that triggers the lower precedence market information and the higher precedence market information to be processed by the client device and updated on the graphical user interface together. Other pre-defined conditions may also be programmed in addition to, or in place of, the receipt of a high precedence message. For instance, a pre-defined condition might also include a time period, a calculation, or some other user-defined process that determines when to process messages at the client device.

Regardless of what market information is included in the message, a snapshot of the market information contained in each message may be saved at the client device. If the market information included in the current received message contains inside market information and thus is higher precedence, the client device may process and update the graphical user interface as soon as possible. Alternatively, if the market information included in the current received message is not related to the inside market and thus is lower precedence, the client device will compare the market information included in the current received message to a saved snapshot of the market information contained in previously received lower precedence messages stored in the data structure. If the current received message of lower precedence contains more recent market information than the snapshot of the previously received message(s) stored in the data structure, then the market information contained in the current received message coalesces with or overwrites the previously stored market information. A snapshot of the coalesced market information may be stored in the data structure until a pre-defined condition is satisfied. It should be understood that if there are no messages stored in the data structure, the client device simply stores a message of lower precedence as there are no saved snapshots which the message may be compared.

It is of the utmost importance to a trader that the market information included in the messages of higher precedence are processed and the graphical user interface is repainted with the updated market information as quickly as possible. However, it is equally important that when any change occurs in the inside market, such as any of the prices included in the inside market shifting up or down in price, the entire market depth, or quantities available at the inside market and at other prices away from the inside market, be updated on the graphical user interface. In this instance, if only the inside market were updated on the graphical user interface without updating the remaining market depth, the trader would have an incomplete and almost unusable set of market information to use when trading. As will be further described, the client device may store a snapshot of the market information from the messages of lower precedence in a data structure until a pre-defined condition is satisfied. Specifically, market information from messages of lower precedence may be stored in the data structure until a higher precedence message is received at the client device. For example, if a message of higher precedence arrives at the client device, the client device will process the market information of any previously stored lower and the current higher precedence messages together and then update the graphical user interface with the most up to date market information and accurate representation of the current market to display to the trader.

It should be understood the example embodiments may reduce the burden on the client device regardless of whether or not the client is receiving all of the messages from the electronic exchange or if the messages are possibly limited by an intermediary device. In some instances, such as when automated trading tools or black box trading, are being used, it may be beneficial for a client device to receive all messages from an exchange. However, if the messages are limited by an intermediary device, the example embodiments may still be applied to reduce the overall processing burden on the client device.

The above example system and method illustrates a way to optimize the frequency of market information updates on a graphical user interface at a client device. Other examples are provided herein. Modifications may also be made to the system and methods without departing from the spirit or scope of the invention. Additional features and advantages of the example embodiments will be set forth in the description that follows. The features and advantages of the example embodiment may be realized and obtained through the embodiments particularly pointed out in the appended claims. These and other features will become more fully apparent from the following description and appended claims, or may be learned by the practice of the example embodiments as set forth hereinafter.

BRIEF DESCRIPTION OF DRAWINGS

Example embodiments are described herein with reference to the following drawings, in which.

DETAILED DESCRIPTION

I. Overview

Figure 1:
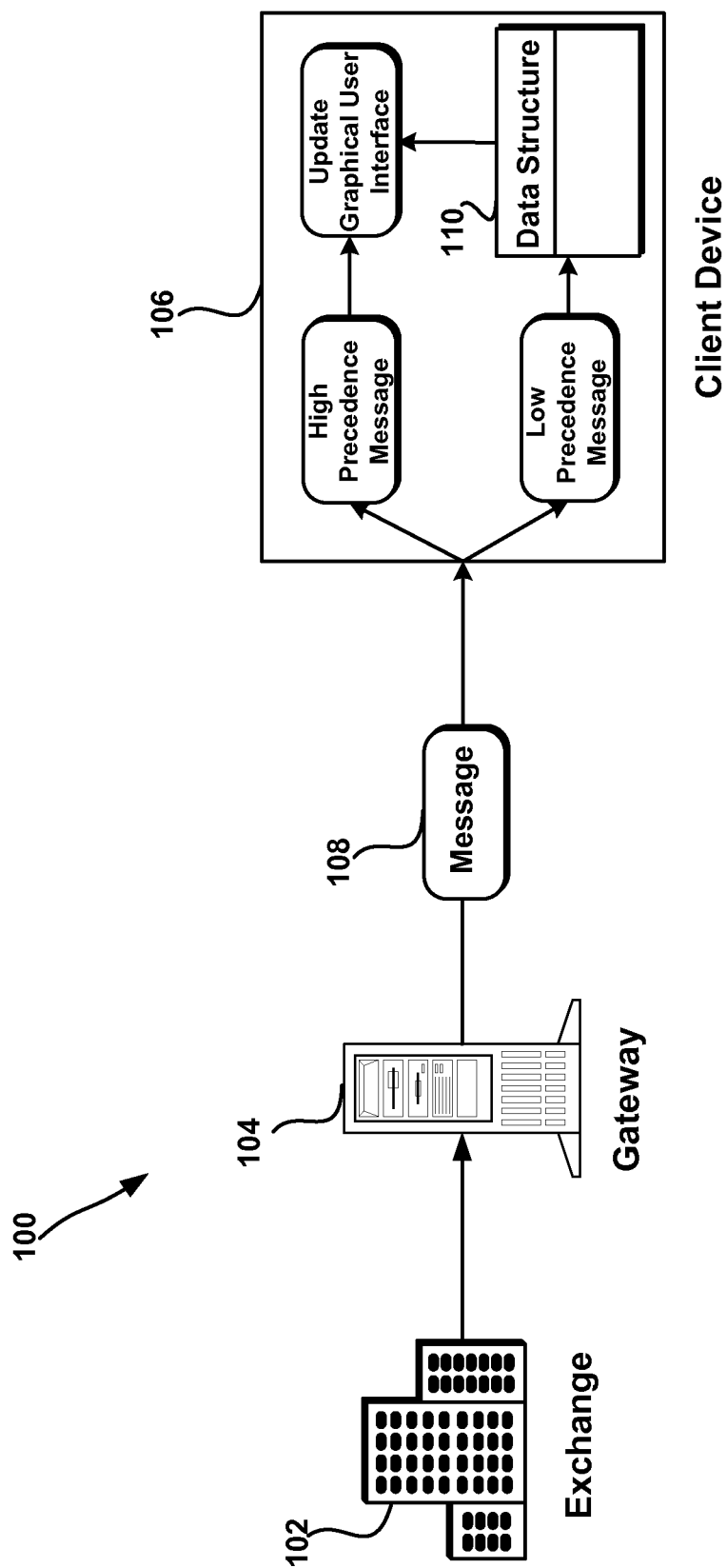
FIG. 1 is a block diagram illustrating a trading system that provides the optimization of the frequency of market information updates in an electronic trading environment.

A need in the art is addressed by providing a system and method for prioritizing data delivery in an electronic trading environment. A system and related methods for prioritizing data delivery at a network device other than a client device is described in U.S. patent application Ser. No. 11/551,567, filed on Oct. 20, 2006, entitled "A System and Method for Prioritized Data Delivery in an Electronic Trading Environment," the contents of which are incorporated herein by reference.

It should be understood that it may be beneficial for the client device to receive all of the messages from an electronic exchange, instead of the messages possibly being limited by a gateway or any other network device. For example, client devices may be using software with automated trading tools or black box trading, that require the receipt of all messages to run correctly and effectively aid the trader while trading. However, repainting all of the market information received in the messages to a graphical user interface can use up massive amounts of processing power compared to other tasks in a trading system. It is advantageous to reduce the frequency of painting to the graphical user interface, as described in the example embodiments, to reduce the load on the client device and to free up processing power for other tasks. Alternatively, if the messages are limited by a gateway or any other network device, the example embodiments may still be applied and provide benefits to the trader by freeing up the client device to do other tasks.

A system and method for optimizing the frequency of market information updates in an electronic trading environment are provided. The messages described herein include market information related to one or more tradable objects that are traded at an electronic exchange. The example embodiments are particularly useful when the market is fluctuating rapidly and massive amounts of market updates, in the form of messages, are being sent from the electronic exchange to a connected intermediary device and then to a client device. The example embodiments may also be useful at all times during the course of a trading session to reduce the overall CPU usage. According to the example methods for optimizing the frequency of updating market information are provided by associating messages of less importance to a trader a lower precedence for processing at the client device and messages of more importance a higher precedence for processing at the client device. For example, messages that relate to the inside market may be considered a higher precedence to a trader and are therefore ushered through and processed and displayed by the trading system faster as compared to lower precedence messages that are not related to the inside market.

Associating a precedence level with a message can be based on many different pre-set criteria, which can be hard coded or configured by a trader, if so desired. For example, as will be discussed below, traders generally base the placement of their orders on the inside market prices, last traded price, market movements, and quantities available at the inside market prices. As the inside market generally represents the most precise current state of the market, it is beneficial that the inside market is displayed or processed by the trading system as quickly and as accurately as possible. Therefore, it is beneficial that the market information related to the inside market be processed by the client device at a more rapid rate than the lower precedence market information related to the quantities at prices outside the inside market. The precedence level associated with a message may determine how quickly that message will be processed by the client device and ultimately available for the trader to utilize.

Accordingly, in one example embodiment, messages relating to the inside market, and quantities at those prices, are assumed to be extremely important to a trader, and are therefore of a higher precedence level. If another item of interest is deemed important to a certain trader, for example, last traded price or last traded quantity, then the system can be configured to give that item of interest a higher precedence level (so any item of interest may be substituted for the "inside market" as used herein). Messages associated with the higher precedence level are quickly buffered, processed by the client device, and then the graphical user interface may be repainted the updated market information. A buffer is a temporary storage area, usually in Random Access Memory (RAM), used for the purpose of acting as a holding area which enables the CPU to manipulate the data before it is transferred to the next device. It should be understood that buffering the message preferably occurs at such a rapid rate that the message is ultimately processed by the client device in near real-time. Once processed, the client device may, for example, display the market information on a graphical user interface, such as an electronic trading interface, or chart the market information on a graph for the trader to utilize while trading.

Oftentimes, the market information relating to quantities at prices outside of the inside market do not take as high of a precedence to the trader as the inside market information. The amount of time a trader spends analyzing the quantities at prices outside of the inside market, may in some instances, be considered minimal by comparison. Therefore, market information relating to the quantities at prices outside of the inside market are generally not as important and may not be processed and made available to the trader, depending on the conditions, as quickly as the inside market data. According to one example embodiment, messages containing such lower precedence market information may be buffered and then stored in a data structure until a pre-defined condition is satisfied. The pre-defined condition might be a time period, the receipt of a higher priority message at the intermediary device, a calculation, or some other user-defined process used to determine when to send messages to the client device. For example, processing and updating the graphical user interface with lower precedence market information and higher precedence market information when a higher precedence message is received at the client device, ensures that the client device processes the most up-to-date and accurate market information and makes the market information available for use by the trader as quickly as possible.

Prior to any lower precedence messages being stored in a data structure, a snapshot of the market information contained in each message is saved at the client device. A snapshot may be defined herein as temporary data backup of the market information included in a message. The market information included in a current received message may be compared to the snapshot of the market information from previously received messages. If the market information included in the current received message is not related to the inside market and is of lower precedence, the client device compares the market information included in the current received message to the saved snapshot of the market information contained in other previously received lower precedent messages stored in the data structure. If the current received message of lower precedence contains more recent market information than the snapshots of the previously received message(s) stored in the data structure, then the market information contained in the current received message coalesces with or overwrites the previously stored market information. Coalescing is defined herein as consolidating multiple market information updates with other related market information updates to create a single update.

For example, if a lower priority message arrived at the client device containing the market information "Quantity 100 at Price 100", a snapshot would be saved of the message, then the message would be stored in the data structure. However, if another lower priority message arrived containing the market information "Quantity 50 at Price 100", then the current received message would be compared to the saved snapshot. The client device would determine that the current received message contained more recent market information and then two messages may be coalesced and the previous quantity of "100" would be overwritten by the more up to date quantity of "50." It is advantageous to utilize coalescing as a method to reduce the overall amount and size of messages processed by the client device. While the concepts of coalescing are described in the present application, a further description of coalescing may be found in commonly owned U.S. patent application Ser. No. 10/184,498, entitled, "System and Method for Coalescing Market Data at a Client Device," filed on Jun. 26, 2006, the contents of which are incorporated herein by reference.

The coalesced market information may be stored in the data structure until a pre-defined condition is satisfied. It should be understood that if there are no messages stored in the data structure the client device stores a message of lower precedence as there may not be a saved snapshot to compare the current received message to.

While the example embodiments are described herein with reference to illustrative embodiments for particular applications, it should be understood that the example embodiments are not limited thereto. Other systems, methods, and advantages of the present invention will be or become apparent to one with skill in the art upon examination of the following drawings and description, such as giving another item of interest a higher priority. As previously stated, it is intended that all such additional systems, methods, features, and advantages be within the scope of the present invention, and be protected by the accompanying claims.

II. A First Example Trading System

According to the example embodiments, the communication between an electronic exchange and a client device involves an exchange broadcasting messages to a connecting network device such as a gateway or router (or some other intermediary device, collectively referred to herein as a "gateway"), and the network device then relaying the market information of that message to the client device. Software and hardware components or a combination thereof, at the client device can implement the example embodiments described herein.

For example, assume the client device has received a message containing market information from an electronic exchange or an intermediary device. At a time of high message traffic, the client device determines, based on the pre-set criteria, the precedence level of the message. If the message is considered a lower precedence message, the client device will store a snapshot of the market information from the message in a data structure, where the most recent lower precedence market information will be stored and coalesced with any previously stored lower priority market data, until a pre-defined condition is satisfied. An example list of pre-defined conditions was described above. According to one example pre-defined condition (i.e., receipt of a message of higher precedence), if a message of higher precedence then arrives at the client device, the client device will process the market information of both the previously stored lower and the current higher precedence messages together at the client device and then update the graphical user interface with the most up to date market information. If a message of higher precedence arrives at the client device first and there is no lower precedence market information stored in the data structure, the higher precedence market information will immediately be processed by the client device and the graphical user interface may be updated as soon as possible. It should be understood that a client device may be connected to one or more gateways connecting to one or more electronic exchanges. A trader may be trading multiple tradable objects that may be related in someway. In an alternative embodiment, when a higher precedence message associated to one tradable object is received at the client device, all lower precedence messages associated to that tradable object or other related tradable objects may be processed and updated on the graphical user interface.

FIG. 1 shows a block diagram illustrating a trading system that provides the optimization of the frequency of market information updates in an electronic trading environment. Specifically, FIG. 1 includes an electronic exchange 102, a gateway 104, a client device 106, a message 108, and a data structure 110. Electronic exchange 102 may host one or more computer-based electronic markets. Traders may connect to the one or more electronic markets to trade tradable objects. Gateway 104 is a network device and includes one or more computers (or programs) running software that receives and transmits market information to and from exchange 102 in the form of messages which may include price, order, and fill information. Client device 106 is a computer that receives one or more messages from gateway 104. Also included in FIG. 1 is illustrative message 108. Message 108 contains market information relating to a tradable object. Message 108 may include current inside market information, trade related information, or even market information relating to the current price levels outside the current inside market. Determining the actual contents of message 108 may be performed at client device 106. Data structure 110 temporarily stores messages that are determined to be of a lower precedence, more of which is described below.

A. Exchange

Exchange 102 broadcasts many different types of market information messages to connecting gateways, traders, brokers, etc. Gateway 104 connects to the exchange 102 to receive the broadcast market information messages, which gateway 104 may then relay to client device 106. It should be understood that a message from one exchange may contain market information representing a different tradable object than a message from a second exchange.

In general, a message from exchange 102 may include market information representing prices and quantities for a tradable object. For example, the message could represent market information related to the inside market, such as the highest bid or the lowest ask, or market information relating to prices outside the inside market. It should be understood that the messages received from the electronic exchange may include other data and should not be limited to the examples referenced above.

One of ordinary skill will appreciate that any message or message type provided by an exchange can be utilized by the example embodiments and one could configure the system to work with those messages or message types appropriately.

B. Gateway

As mentioned earlier, gateway 104 includes one or more computers (or programs) running software that receives and transmits market information to and from the exchange 102. As used herein, a computer includes any device with memory and a processor capable of processing information to produce a desired result. Thus, a gateway can be a computer of any size such as a network server, workstation, personal computer, or laptop.

C. Client Device

As mentioned earlier, client device 106 is a computer that allows a trader to participate in the market at exchange 102. In general, it can use software that creates specialized interactive trading screens on the client device's terminal. The trading screens enable traders to enter and execute orders, obtain market quotes, and monitor positions. The range and quality of features available to the trader on a trading screen varies according to the specific software application running, for example, black box trading software or strategy trading software.

According to the example embodiment, electronic exchange 102 broadcasts messages containing market information and the connected gateway 104 receives the messages. Gateway 104 then sends the message to client device 106. However, once the message arrives at the client device 106, the client device 106 may optimize the frequency at which the market information is updated on the graphical user interface.

Data structure 110 is used to store the market information of lower precedence. Generally, data structures are used to store related market data such that it can be accessed and used efficiently. There are a variety of data structures known in the art; however, the described example embodiments should not be limited to one specific type of data structure. It should also be understood that the data structure can be located at the exchange or at the gateway or be in communication with either or both.

Based on the pre-set criteria for determining the precedence level of a message, client device 106 associates a precedence level with each message as it is received. According to an example embodiment, client device 106 determines the precedence level of message 108 by examining the message header. Each message sent from an electronic exchange contains a message type. The header portion of the message may include a differentiating message type. It should be understood, that message types may vary from one exchange to another, so it is beneficial for a client device to have knowledge of the different possible types of messages. It should also be understood that exchanges may send messages that contain all types of information in one message. In such a message, the client device may not examine a message header, but instead would analyze the contained market information. Based on the message type of message 108, client device 106 optimizes the frequency at which the contained market information is updated. If the message includes higher precedence market information, the message may be a Higher Precedence Message and may be processed by the client device and market information from the message may be used to update the graphical user interface without any delay, as shown in FIG. 1. Also shown in FIG. 1, if the message is a Lower Precedence Message containing lower precedence market information, a snapshot of the market information from the message will be stored in data structure 110 until a pre-defined condition is satisfied. Once the pre-defined condition is satisfied, client device 106 will Update the Graphical User Interface, also shown in FIG. 1.

II. Example System and Function Overview

Figure 2:
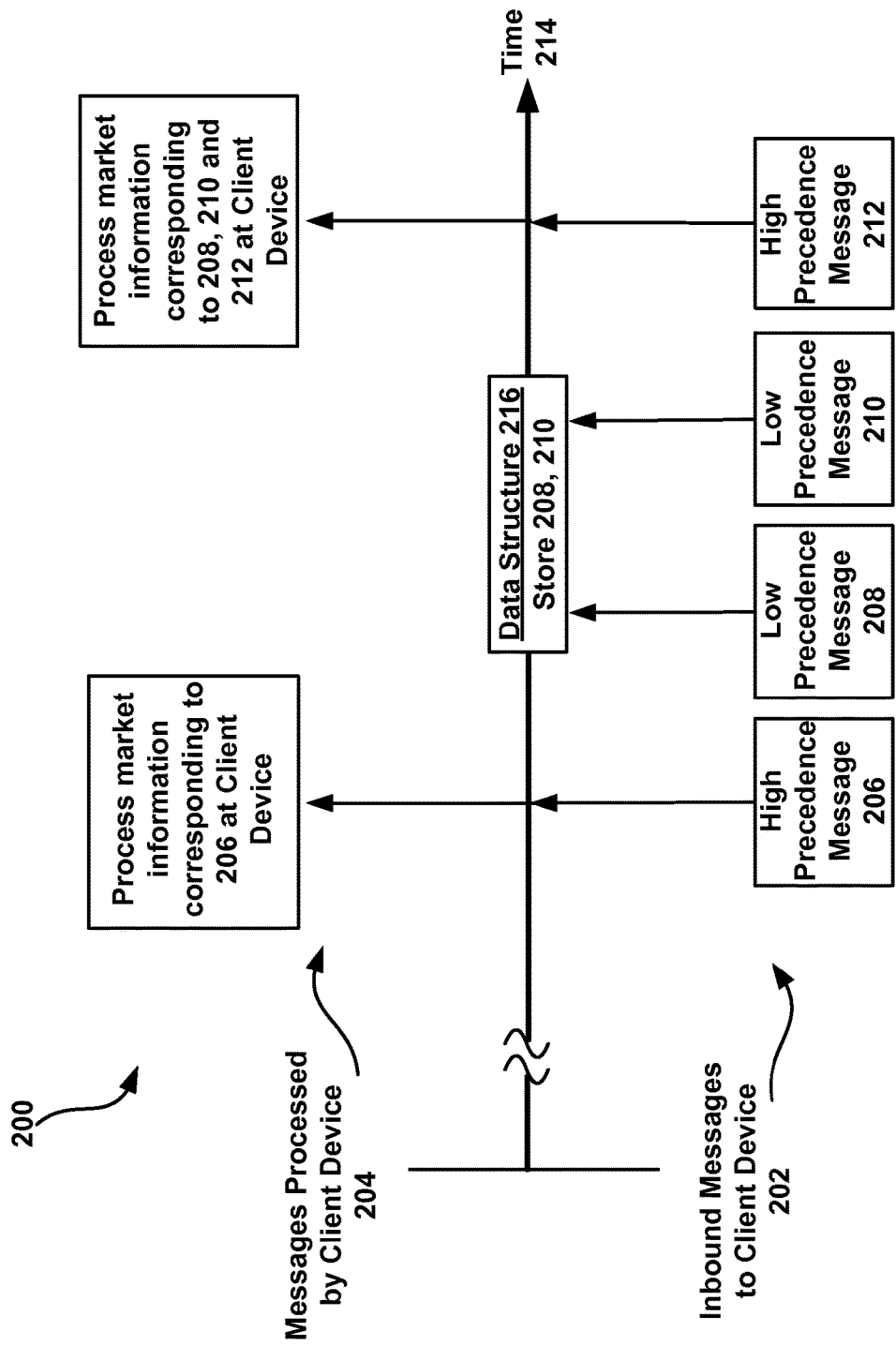
FIG. 2 is a timeline illustrating messages flowing through the example system shown in FIG. 1.

FIG. 2 is a timeline illustrating messages arriving at the client device from the gateway. Specifically, FIG. 2 includes inbound messages to the client 202, messages processed by the client device 204, high precedence messages 206 and 212, lower precedence messages 208 and 210, timeline 214, and data structure 216. According to the example embodiments, when client device 106, shown in FIG. 1, determines that the received message is higher precedence, the market information is processed by the client device and repainted on the graphical user interface. Otherwise, according to an example embodiment the message is stored, at least temporarily, at data structure 216.

In FIG. 2, message 206 is received at the client device, and determined to contain market information related to the inside market. Therefore, the client device associates a higher precedence level with message 206. Once this determination is made, market information from message 206 is buffered, and then processed by the client device without being stored in the data structure 216. Once the message is processed, the client device may repaint the graphical user interface with the updated market information from the message as quickly as possible.

Message 208 is received at the client device following message 206 and the client device determines that message 208 contains market information relating to quantities at prices outside of the inside market and therefore considers message 208 to be of the lower precedence level. As shown in FIG. 2, the client device stores a snapshot of the lower precedence market information of message 208 in data structure 216 until a pre-defined condition is satisfied. According to the example embodiments, storing message 208 instead of processing it and repainting the graphical user interface with the market information immediately, makes more processing power available to other functions in the trading system. The same applies to message 210; with each message that is stored, more processing power is made available to the entire trading system.

Similarly, message 210 is received at the client device. The client device determines that message 210 also contains information relating to quantities at prices outside of the inside market and therefore considers message 210 to also be of the lower precedence level. As shown in FIG. 2, the client device stores a snapshot of the market information from the lower precedence message 210 in data structure 216 with market information from message 208 until a pre-defined condition is satisfied. It should be understood that the lower precedence market information of messages 208 and 210 may be coalesced together to create one single snapshot in data structure 216.

For example, a pre-defined condition could be defined to process any stored data from a lower precedence level message along with a higher precedence message if and when at a later time, a higher precedence level message is received from the electronic exchange. Higher precedence level messages might include messages related to the inside market, market changes within a range of price levels from the inside market, trades, or any other item of interest.

In another example, a pre-defined condition may be a time period defined by a trader or by the electronic trading system, such that any coalesced lower priority message data may be processed by the client device as soon as the user-defined time period expires.

According to yet another example, a pre-defined condition may be based on an event, such as when the processor has been inactive for a specified time period and there is coalesced lower precedence market information stored in the data structure waiting to be processed by the client device. Specifically, if there are any snapshots of lower precedence market information stored in the data structure after a period of inactivity in the processor, then the client device will retrieve that lower precedence market information and update the graphical user interface. For example, the inside market may, in some instances, jump dramatically and have a series of fast market updates, however, this burst in the market may be very brief. The market jump may be followed by a period of inactivity. In the previously described examples, the lower priority market information received during the burst in the market may be stored in the data structure until the time period expires or until the next message is received. However, the market information received during the market burst is extremely important to the trader, and waiting for either the time period to expire or the receipt of another message may cause the market information displayed on the graphical user interface to be inaccurate and delayed. It is therefore beneficial to process any lower precedence market information as soon as the processor determines that a period of inactivity has occurred and that there is coalesced lower precedence market information waiting to be processed by the client device.

In another example, such as in the case of when the market has closed, waiting for the next received message, as described above, might mean that the client device is waiting to process the stored coalesced lower precedence market information for an extended period of time, possibly even until the next trading day. Again, the processor may recognize a period of inactivity, and process any lower precedence market information stored in the data structure instead of waiting for the pre-defined time period to expire or for another message to arrive.

Additionally, the pre-defined condition may be a combination of any of the previously discussed pre-defined conditions, for instance a defined time period may be used in conjunction with the receipt of a higher precedence message.

In another example, message delivery based on the example provided above may be modified upon a determination by the client device that the market is fast or slow. A client device may determine if a market is fast or slow by monitoring how many messages are received within a user-defined time period. If the market is slow, instead of using pre-defined conditions as the basis for processing of messages at the client device, the client device may bypass the rules for optimizing the frequency of market information updates as described above and may process all of the received messages at the client device without storing them in the data structure or considering precedence levels for the received messages. With respect to a fast market, e.g. a market with many updates, the client device may use any of the previously discussed pre-defined conditions or may choose to only process the higher precedence messages at the client device so as to reduce the CPU usage. In this example, a fast market can be determined by also monitoring the number of messages received within a user-defined time period. If the amount of messages received during the user-defined time period is greater than a pre-defined number, then the market is considered fast. In this situation, the lower precedence messages may for example, be stored in the data structure but not processed by the client device until the state of the market has changed.

Based on the pre-defined condition, the client device may determine which messages of the lower precedence level should be processed and when they should be processed by the client device, resulting in optimization of CPU processing load at the client device. It should be understood that although the example embodiments reference one client device, that multiple client devices could be used and generally referred to as the client side.

Referring back to FIG. 2, according to an example embodiment, assume that the pre-defined condition has been defined to process any coalesced lower precedence market information that is stored in data structure 216 at the client device along with any higher precedence market information that is received at the client device. Message 212 then arrives at the client device and contains market information relating to the inside market, therefore message 212 is associated with the higher precedence level. When message 212 arrives at the client device, the market information of message 212 will be processed by the client and updated on the graphical user interface along with any coalesced lower precedence market information being stored in data structure 216. When message 212, a higher precedence level message, arrives at the client device, the pre-defined condition is considered satisfied by the client device. Once message 212 is received, the coalesced market information of messages 208 and 210 are retrieved from data structure 216, and the coalesced market information of messages 208 and 210, and the market information of message 212 are processed by the client device and the graphical user interface is repainted with the processed market information. It should be understood that if an additional lower precedence market information was stored in data structure 216 with messages 208 and 210, the messages may be coalesced together to create a single message.

As previously stated, a trader may define a range of price levels around the inside market, or any other price level such as the last traded price, to be used in determining the precedence level of the message. The range of price levels may be user-configurable, and a trader may define price levels the trader is most interested in. For example, a range of price levels of "2" would define "2" price levels above the lowest available offer price, the inside market, and the "2" price levels below the highest available bid price. When a message is received at the client device that includes market information relating to a change within the "2" price levels above or below the inside market, then the client device may also associate the higher precedence level with the message data and process it as quickly as possible. It should be understood that a trader could define multiple ranges of price levels, each being associated with a different precedence level. For example, the pre-set criteria for the higher precedence level may be prices within "2" price levels of the inside market. The next precedence level may be prices within the next "3" price levels, etc. In another example, the range of price levels could be defined to only include the prices levels that had a quantity available. Instead of defining the range of prices to include the next "3" price levels above or below the inside market, the range would consist of the next "3" prices levels above or below the inside market that had any quantity available.

Figure 3:
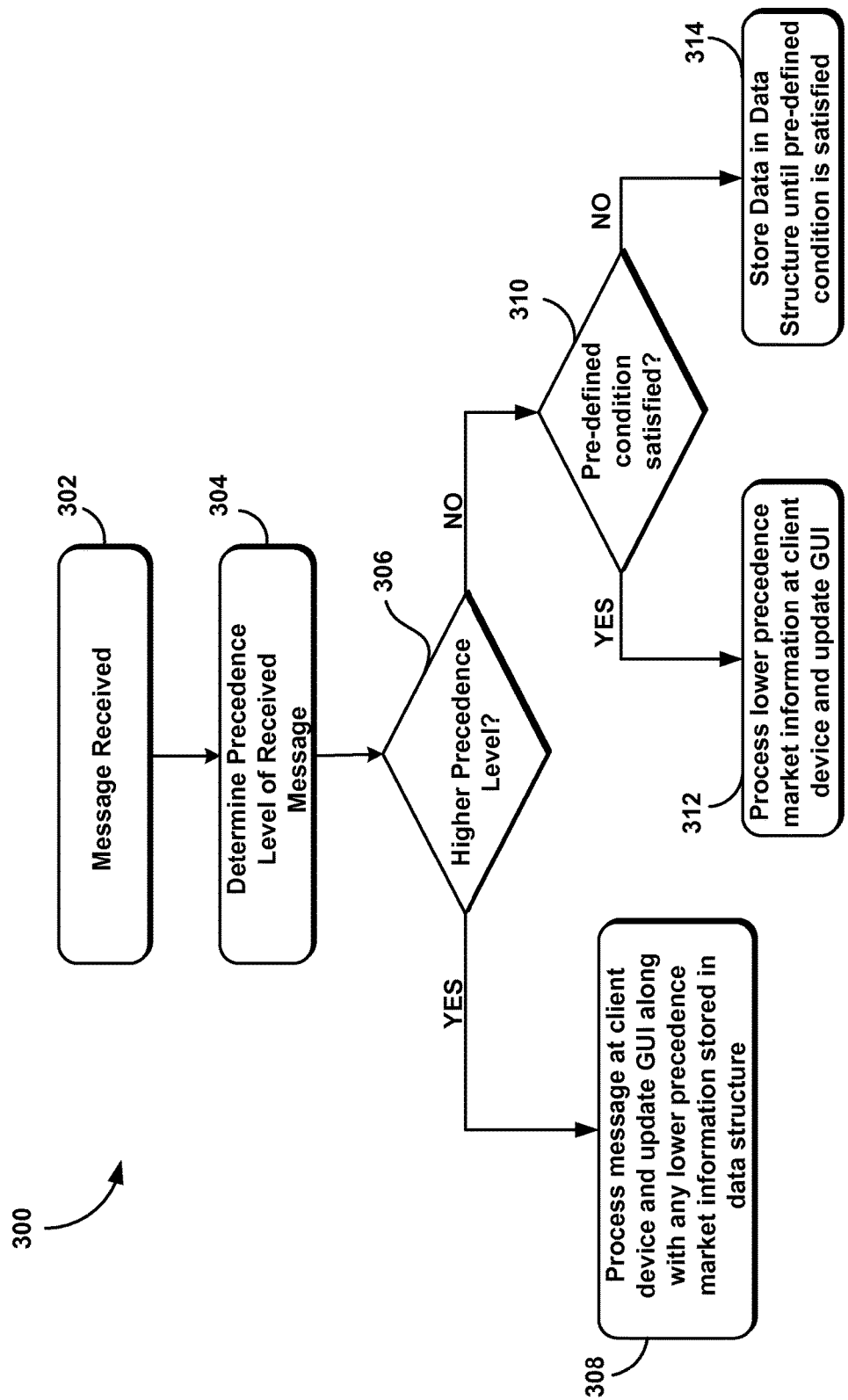
FIG. 3 is a flow chart illustrating an example method for optimization of the frequency of market information updates in an electronic trading environment.

FIG. 3 is a flow chart illustrating an example method for optimizing the frequency of market information updates in electronic trading environment. It should be understood that the flow chart only shows the functionality and operation of a possible implementation of the present embodiments. In this regard, each block may represent a module, a segment, or a portion of the program code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

At step 302, a message is received at the client device from the gateway or electronic exchange. The message contains market information related to a tradable object.

At step 304, the client device determines what market information is contained in the message by examining the message header (or some other part of the message). Based on the pre-set criteria, the market information of the message is associated with a precedence level.

At step 306, the client device determines if the message contains market information that would be of higher precedence or lower precedence to the trader. According to an example embodiment described above, if the message contains market information relating to the inside market or trade related information such as the last traded price or quantity, the message data is considered to be of the higher precedence level. Otherwise, the message data is considered to be of the lower precedence level and is stored in the data structure until a pre-defined condition is satisfied.

If the market information is of a higher precedence, the client device determines if there is any other lower precedence market information stored in the data structure, and if there is, the client device will process and repaint the graphical user interface with both the higher precedence and lower precedence market information together at step 308. If the data structure does not contain any lower precedence market information, the higher precedence market information will be processed by the client device by itself. Once the market information is processed by the client device, the market information may be updated on the graphical user interface for the trader to utilize while trading and analyzing the current market.

If the market information is of the lower precedence level, the client device determines if the pre-defined condition has been satisfied at step 310. According to the example embodiment, if the pre-defined condition has been satisfied, the client device will process the lower precedence information stored in the data structure at step 312. If the pre-defined condition has not been satisfied, the client device stores and coalesces the market information of the lower precedence message in a data structure at step 314 until a pre-defined condition is satisfied. As previously described, the pre-defined condition can range from a time based condition, a market based condition, the receipt of a specified type of message, or some other user-defined process used to determine when to process the messages to the client device and update on the graphical user interface. It should be understood that a lower precedence message may never get processed by the client device if the lower priority market information was coalesced with other lower precedence market information, for example.

CONCLUSION

The example embodiments discussed above describe a system and method for optimizing the frequency of market information updates in an electronic trading environment. By optimizing the frequency of market information updates associated with a tradable object, the overall CPU usage may be reduced while the information that is most important to the trader may be updated on the graphical user interface as efficiently as possible. The method includes, for example, associating a higher precedence level with a message comprising market information related to the inside market and associating a lower precedence level with a message comprising market data related to the quantities at prices outside the inside market. Based on the precedence level associated with a message, the client device may optimize when and what market information may be repainted on the graphical user interface.

The above description of the example embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for dynamically determining quantity for risk management may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed is:

1. A non-transitory computer readable medium having stored therein instructions executable by a processor, wherein the instructions are for updating a graphical user interface of a client device based on market update messages being received from an electronic exchange, the instructions executable to:

define at the client device a low precedence level and a high precedence level to be applied to market update messages for a tradable object being received from the electronic exchange to reduce a frequency of updating the graphical user interface at the client device, wherein each of the low precedence level and the high precedence level is determined based on a type of market data in received market update messages;

receive at the client device comprising the graphical user interface a first market update message from the electronic exchange, the first market update message comprising market information related to the tradable object;

determine based on the market information included in the first market update message that the first market update message is the low precedence level;

refrain from providing the first market update message for processing and display at the graphical user interface and store the market information associated with the first market update message in a data structure until another market update message received at a later time from the electronic exchange is determined to comprise market information associated with the high precedence level;

receive at the client device a second market update message from the electronic exchange, the second market update message comprising market information related to the tradable object;

determine based on the market information included in the second market update message that the second market update message is the low precedence level;

refrain from providing the second market update message for processing and display at the graphical user interface and coalesce the market information in the second market update with the market information associated with the first market update message stored in the data structure, wherein coalescing comprises overwriting the market information in the data structure with the market information in the second market update to generate a coalesced market data update including coalesced market information;

store the coalesced market information associated with the coalesced market data update in the data structure until another market update message received at a later time from the electronic exchange is determined to comprise market information associated with the high precedence level;

receive at the client device a third market update message from the electronic exchange, the third market update message comprising market information related to the tradable object;

determine based on the market information included in the third market update message that the third market update message is the high precedence level; and provide the market information in the received third market update message along with the stored coalesced market information to the graphical user interface, wherein the market information in the received third market update message and the coalesced market information is processed and displayed at the graphical user interface.

2. The non-transitory computer readable medium of claim 1, wherein the type of market data associated with the high precedence level comprises market information related to at least one of a highest bid price, a lowest ask price, or a last traded price.

3. The non-transitory computer readable medium of claim 1, wherein the type of market data associated with the high precedence level comprises market information related to a quantity at a highest bid price or a lowest ask price.

4. The non-transitory computer readable medium of claim 1, wherein the type of market data associated with the high precedence level comprises market information related to a predetermined price level.

5. The non-transitory computer readable medium of claim 1, wherein the type of market data associated with the high precedence level comprises market information related to a range of price levels.

6. The non-transitory computer readable medium of claim 5, wherein the range of price levels is determined based on a reference price level.

7. The non-transitory computer readable medium of claim 6, wherein the reference price level is based on an inside market price or a last traded price.

8. The non-transitory computer readable medium of claim 5, wherein the range of price levels is determined based on a predefined number of price levels.

9. The non-transitory computer readable medium of claim 1, wherein the type of market data associated with the low precedence level comprises market information related to a price level other than a highest price level or a lowest ask price level.

10. The non-transitory computer readable medium of claim 1, wherein the type of market data associated with the low precedence level comprises market information related to a quantity at a price level other than a highest bid price or a lowest ask price.

11. The non-transitory computer readable medium of claim 1, wherein the instructions are further executable to:
update the graphical user interface with the coalesced market information associated with the low precedence level upon detecting a predetermined condition.

12. The non-transitory computer readable medium of claim 11, wherein the predetermined condition comprises a time period.

13. The non-transitory computer readable medium of claim 11, wherein the instructions are further executable to:
detect a period of market inactivity, wherein the predetermined condition, upon detecting the period of market inactivity, comprises a time period or receipt of a next message comprising market information associated with the high precedence level or the low precedence level.

14. The non-transitory computer readable medium of claim 11, wherein the predetermined condition is based on detecting a predetermined level of market activity.

15. The non-transitory computer readable medium of claim 14, wherein the predetermined level of market activity is a slow market activity.

* * * * *